(12) United States Patent
Alser et al.

(10) Patent No.: US 10,259,337 B2
(45) Date of Patent: Apr. 16, 2019

(54) ELECTRIC VEHICLE BATTERY CHARGE AND DISCHARGE MANAGEMENT

(71) Applicant: Faraday&Future Inc., Gardena, CA (US)

(72) Inventors: John Alser, Newport Beach, CA (US); Douglas D. Chidester, San Pedro, CA (US); Anil Paryani, Cerritos, CA (US); Phillip John Weicker, Los Angeles, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 40 days.

(21) Appl. No.: 15/337,909

(22) Filed: Oct. 28, 2016

(65) Prior Publication Data

US 2017/0120772 A1 May 4, 2017

Related U.S. Application Data

(60) Provisional application No. 62/248,998, filed on Oct. 30, 2015, provisional application No. 62/249,101, filed on Oct. 30, 2015.

(51) Int. Cl.
*B60L 11/18* (2006.01)
*H02J 7/00* (2006.01)
*H02P 27/06* (2006.01)

(52) U.S. Cl.
CPC ....... *B60L 11/1868* (2013.01); *B60L 11/1803* (2013.01); *B60L 11/1861* (2013.01); *B60L 11/1866* (2013.01); *H02J 7/0019* (2013.01); *H02J 7/0021* (2013.01); *H02P 27/06* (2013.01); *B60L 2240/547* (2013.01); *Y02T 10/7055* (2013.01); *Y02T 10/7066* (2013.01)

(58) Field of Classification Search
CPC .............. B60L 11/1803; B60L 11/1861; B60L 11/1864; B60L 11/1868; G01R 31/3606; G01R 31/3658; H02J 7/0019; H02J 7/0021; Y02T 10/7055; Y02T 10/7066
See application file for complete search history.

(56) References Cited

U.S. PATENT DOCUMENTS

| | | | | |
|---|---|---|---|---|
| 5,422,558 | A * | 6/1995 | Stewart | H01M 10/46 320/120 |
| 6,653,745 | B1 * | 11/2003 | Masaki | H02J 7/1423 307/10.1 |
| 9,653,924 | B2 * | 5/2017 | Hiramura | H02J 4/00 |
| 9,748,777 | B2 * | 8/2017 | Owen | H02J 7/0021 |
| 9,762,126 | B2 * | 9/2017 | Ide | H02M 3/158 |
| 9,766,296 | B2 * | 9/2017 | Lee | G01R 31/3606 |
| 9,783,037 | B2 * | 10/2017 | Muto | B60K 1/04 |
| 9,876,460 | B2 * | 1/2018 | Yamamoto | H02P 29/025 |
| 2010/0222952 | A1 * | 9/2010 | Yamaguchi | B60K 6/28 701/22 |

(Continued)

*Primary Examiner* — Levi Gannon
(74) *Attorney, Agent, or Firm* — Knobbe Martens Olson & Bear LLP

(57) ABSTRACT

An adaptive multi-string battery for an electric vehicle is disclosed herein. The battery strings can adaptively be connected to the power bus bars based on the output voltage to be discharged with load. During operation of the vehicle, the voltage, current, and estimate charge can be constantly monitored to change the connected status of the battery strings to the power buses to allow connecting or disconnecting of the battery strings adaptively.

13 Claims, 6 Drawing Sheets

(56) References Cited

U.S. PATENT DOCUMENTS

| | | | | |
|---|---|---|---|---|
| 2010/0318252 A1* | 12/2010 | Izumi | ................... | B60K 6/365 |
| | | | | 701/22 |
| 2012/0212062 A1* | 8/2012 | Yamada | ............... | H02J 7/0019 |
| | | | | 307/80 |
| 2012/0293112 A1* | 11/2012 | Suzuki | ............... | H01M 10/482 |
| | | | | 320/107 |
| 2014/0300180 A1* | 10/2014 | Iwashita | .................. | B60L 3/00 |
| | | | | 307/10.1 |

\* cited by examiner

ELECTRIC VEHICLE BATTERY CHARGE AND DISCHARGE MANAGEMENT

RELATED APPLICATIONS

This application claims the benefit of U.S. Provisional Application Ser. No. 62/248,998, filed Oct. 30, 2015, entitled "ELECTRIC VEHICLE BATTERY DISCHARGE MANAGEMENT," and U.S. Provisional Application Ser. No. 62/249,101, filed Oct. 30, 2015, entitled "ELECTRIC VEHICLE BATTERY CHARGE MANAGEMENT," which are hereby incorporated by reference in their entirety and for all purposes.

BACKGROUND

Field

The described technology generally relates to automobiles, more specifically, to batteries.

Description of the Related Art

Managing a power source in an automobile, such as an electric vehicle, can be challenging as balancing the appropriate level of power, efficiency, and reliability can be difficult. A battery pack sourcing power to an electric vehicle, for example, can suffer from internal or external failures that may result in inability to support critical load or provide sufficient current as required by the vehicle system.

SUMMARY

The methods and devices of the described technology each have several aspects, no single one of which is solely responsible for its desirable attributes.

In one implementation, an electric vehicle comprises a motor coupled to one or more wheels of the electric vehicle, an inverter coupled to the motor; and at least a first power bus coupled to the inverter. A first battery string has an output that is coupled to the first power bus through a first switch. A second battery string different from the first battery string has an output that is coupled to the first power bus through a second switch different from the first switch. Control circuitry is coupled to at least the first switch and the second switch. The control circuitry configured to selectively and independently control the open or closed state of the first switch and the second switch, thereby selectively and independently connecting the output of the first battery string and the output of the second battery string to the first power bus.

In another implementation, a method of powering an electric vehicle comprises determining a plurality of separate output voltages for a corresponding plurality of separate battery strings of the electric vehicle and connecting or disconnecting different ones of the plurality of battery string to the power bus based at least in part on the determined plurality of separate output voltages.

In another implementation, a method of powering an electric vehicle comprises initially connecting some but not all of a plurality of battery strings of the electric vehicle to a power bus and loading the power bus with an electric motor of the electric vehicle. While the power bus is so loaded, measuring the voltage of the power bus and connecting an unconnected one of the plurality of battery strings to the power bus if the voltage of the unconnected one of the plurality of battery strings is within a threshold voltage below the measured voltage of the power bus.

In another implementation, a method of charging an electric vehicle including at least one electric motor driven with at least one power bus is disclosed. The method includes determining a plurality of separate output voltages for a corresponding plurality of separate battery strings of the electric vehicle, identifying the battery string having the lowest voltage, connecting the identified lowest voltage battery string to the power bus, connecting another one of the plurality of battery strings if the voltage of the another battery string is within a threshold voltage difference above the lowest battery string voltage, and connecting a charging power source to the power bus. The method can further include connecting all of the plurality of battery strings to the power bus that are within the threshold difference above the lowest battery string voltage.

BRIEF DESCRIPTION OF THE DRAWINGS

These drawings and the associated description herein are provided to illustrate specific embodiments of the invention and are not intended to be limiting.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An adaptive multi-string battery for an electric vehicle is disclosed herein. The battery strings can adaptively be connected to the power bus bars based on the output voltage to be discharged with a load. During operation of the vehicle, the voltage, current, and estimate charge can be constantly monitored to change the connected status of the battery strings to the power buses to allow connecting or disconnecting of the battery strings for adaptive power management, reduced wear and tear, and minimal faulty operation. The battery strings can also be adaptively connected to the power bus bars based on the output voltage of the battery strings to be charged.

Figure 1:
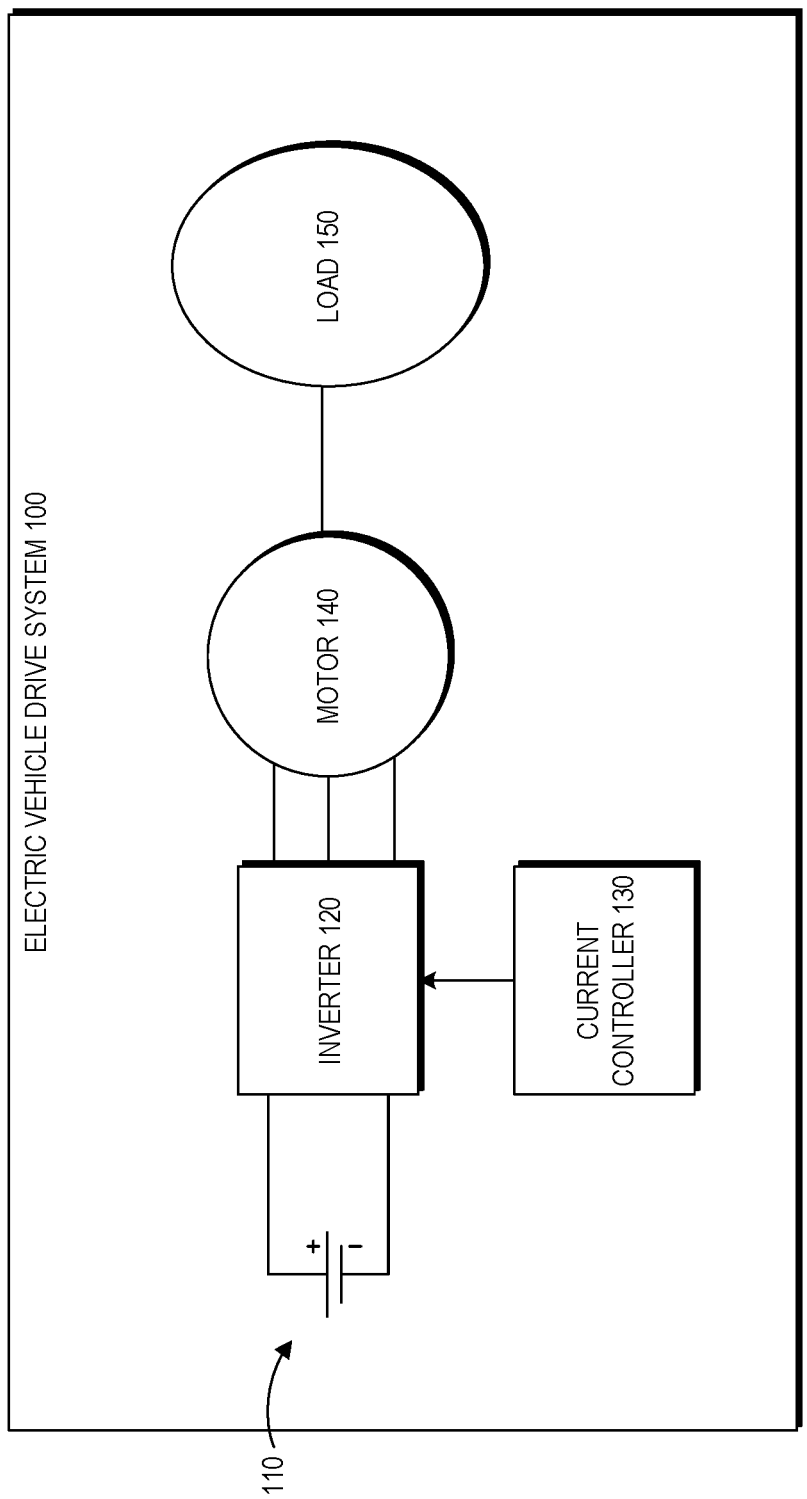
FIG. 1 is a block diagram of an example electric vehicle drive system according to one embodiment.

FIG. 1 depicts a block diagram of an example electric vehicle drive system 100 including a battery or voltage source 110 as described herein. The electric vehicle drive system 100 includes the battery 110, an inverter 120 coupled to the battery 110, a current controller 130, a motor 140, and load 150. The battery 110 can be a single phase direct current (DC) source. In some embodiments, the battery 110 can be a rechargeable electric vehicle battery or traction battery used to power the propulsion of an electric vehicle including the drive system 100. Although the battery 110 is illustrated as a single element in FIG. 1, the battery 110 depicted in FIG. 1 is only representational, and further details of the battery 110 are discussed below in connection with FIG. 2.

The inverter 120 includes power inputs which are connected to conductors of the battery 110 to receive, for example, DC power, single-phase electrical current, or multi-phase electrical current. Additionally, the inverter 120 includes an input which is coupled to an output of the current controller 130, described further below. The inverter 120 also includes three outputs representing three phases with currents that can be separated by 120 electrical degrees, with each phase provided on a conductor coupled to the motor 140. It should be noted that in other embodiments inverter 120 may produce greater or fewer than three phases.

The motor 140 is fed from voltage source inverter 120 controlled by the current controller 130. The inputs of the motor 140 are coupled to respective windings distributed about a stator. The motor 140 can be coupled to a mechanical output, for example a mechanical coupling between the motor 140 and mechanical load 150. Mechanical load 150 may represent one or more wheels of the electric vehicle.

Controller 130 can be used to generate gate signals for the inverter 120. Accordingly, control of vehicle speed is performed by regulating the voltage or the flow of current from the inverter 120 through the stator of the motor 140. There are many control schemes that can be used in the electric vehicle drive system 100 including current control, voltage control, and direct torque control. Selection of the characteristics of inverter 120 and selection of the control technique of the controller 130 can determine efficacy of the drive system 100.

Although not illustrated, the electric vehicle drive system 100 can include one or more position sensors for determining position of the rotor of the motor 140 and providing this information to the controller 130. For example, the motor 140 can include a signal output that can transmit a position of a rotor assembly of the motor 140 with respect to the stator assembly motor 140. The position sensor can be, for example, a Hall-effect sensor, potentiometer, linear variable differential transformer, optical encoder, or position resolver. In other embodiments, the saliency exhibited by the motor 140 can also allow for sensorless control applications. Although not illustrated, the electric vehicle drive system 100 can include one or more current sensors for determining phase currents of the stator windings and providing this information to the controller 130. The current sensor can be, for example, a Hall-effect current sensor, a sense resistor connected to an amplifier, or a current clamp.

It should be appreciated that while the motor 140 is depicted as an electrical machine that can receive electrical power to produce mechanical power, it can also be used such that it receives mechanical power and thereby converts that to electrical power. In such a configuration, the inverter 120 can be utilized to excite the winding using a proper control and thereafter extract electrical power from the motor 140 while the motor 140 is receiving mechanical power.

Figure 2:
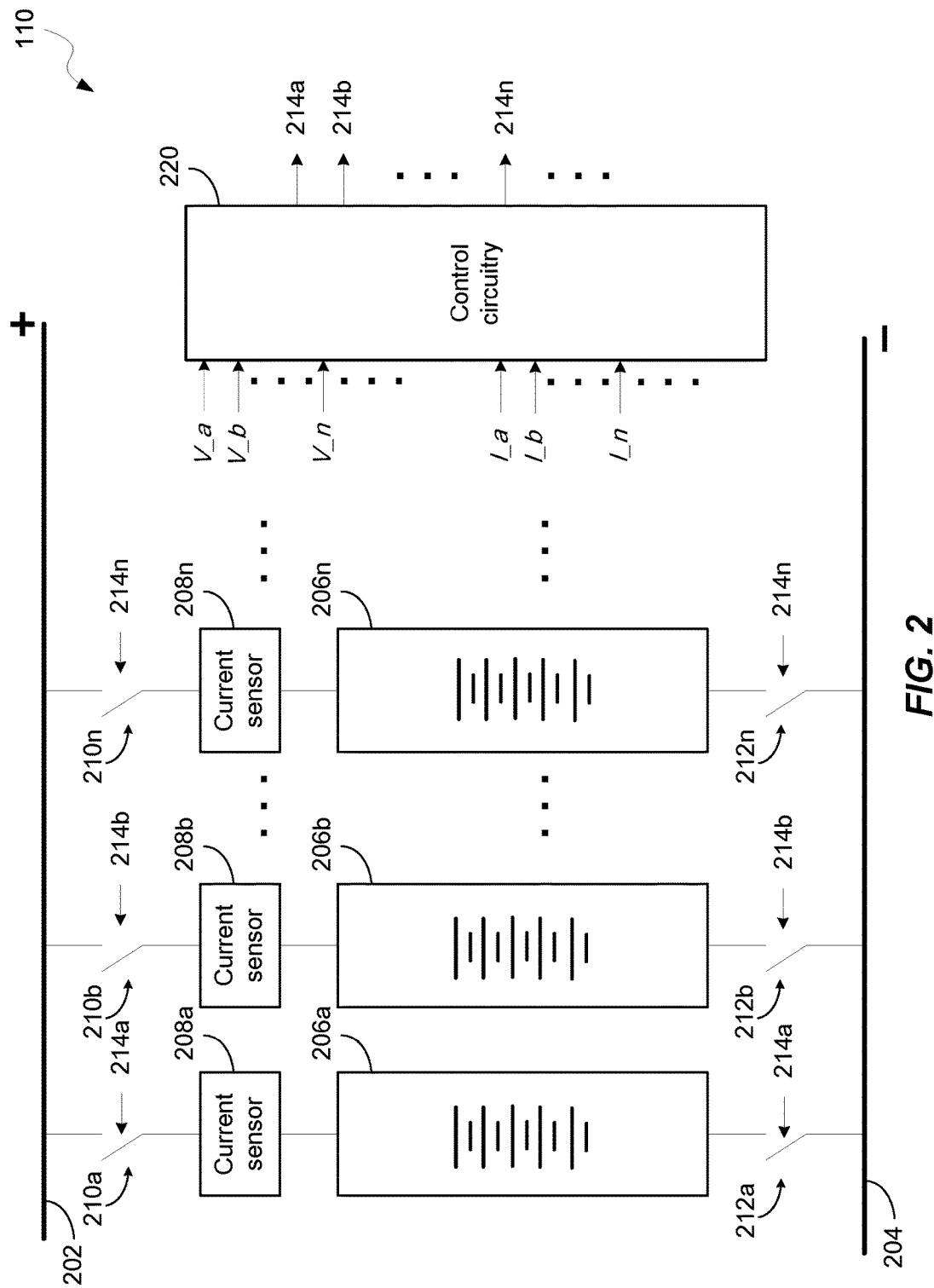
FIG. 2 is a block diagram of an example voltage source according to one embodiment.

FIG. 2 is a block diagram of an example voltage source according to one embodiment. The voltage source 110 can include a plurality of battery strings 206a, 206b, . . . , 206n, . . . , individually or collectively referred to herein as the battery string(s) 206, and a plurality of current sensors 208a, 208b, . . . , 208n, . . . , individually or collectively referred to herein as the current sensor(s) 208. The battery strings 206 can be individually connected to or disconnected from a positive or high power bus 202 and a negative or low power bus 204 through a plurality of switches 210a, 210b, . . . , 210n, . . . , and 212a, 212b, . . . , 212n, . . . , individually or collectively called the switches 210 and 212. The switches 210 and 212 can be controlled by control signals from a control circuitry 220. The control circuitry 220 can receive voltages, V_a, V_b, . . . , V_n, . . . , which are output voltages across the respective battery strings 206a, 206b, . . . , 206n, . . . , using, for example a plurality of sensors (not shown). The control circuitry 220 can also receive currents, I_a, I_b, . . . , I_n, . . . , which are currents from the respective battery strings 206a, 206b, . . . , 206n, . . . , measured by the respective current sensors 208a, 208b, . . . , 208n, . . . . Based at least in part on the voltages, V_a, V_b, . . . , V_n, . . . , and/or currents, I_a, I_b, . . . , I_n, . . . , of the respective battery strings 206, the control circuitry 220 can generate control signals 214a, 214b, . . . , 214n, . . . , individually or collectively referred to herein as the control signal(s) 214, for controlling the respective switches 210 and 212. Further details of the control signals 214 are discussed below in connection with FIGS. 3 and 4.

The battery strings 206 can include a plurality of modules, each of which in turn can include a plurality of cells. For example, in one embodiment, about one hundred cells can be in one module, and about 13 modules can be in one battery string. Within each battery string 206, the constituent modules and cells can be connected in series as symbolically depicted in FIG. 2. In some embodiments, the voltage source 110 can include six battery strings 206 that can be connected to or disconnected from the power buses 202, 204. The battery strings 206 can be implemented with various different types of rechargeable batteries made of various materials, such as lead acid, nickel cadmium, lithium ion, or other suitable materials. In some embodiments, each of the battery strings can output about 375V-400V if charged about 80% or more.

The current sensors 208 can be connected in series with the respective battery strings 206 between the high and low power buses 202, 204. As shown in FIG. 2 the current sensor 208 can be connected to the positive side of the respective battery strings 206 to measure the current from the battery strings 206. In other embodiments, the current sensors 208 can be connected to the battery strings 206 otherwise to measure the current flow to and from the battery strings 206.

The switches 210 and 212 can be contactors configured to connect the battery strings 206 to the power buses 202, 204 or disconnect the battery strings 206 from the power buses 202, 204 in response to the respective control signals 214. The switches 210 can be implemented with any suitable contactors capable of handling the level of current and voltage as needed in connection with, for example, the battery strings 206, the power buses 202, 204, and the load 150 (FIG. 1) within the electric vehicle drive system 100 (FIG. 1). In some embodiments the switches 210 and 212 can be implemented with mechanical contactors or other suitable electrical switching devices. Although in the illustrated example in FIG. 2, the switches 210 (e.g., 210n) and the switches 212 (e.g., 212n) are controlled by the same respective control signals 214 (e.g., 214n), in other embodiments, the switches 210 (e.g., 210n) can be controlled by respective positive bus connect control signals while the switches 212 (e.g., 212n) can be controlled by respective negative bus connect control signals.

The control circuitry 220 can include a plurality of passive and/or active circuit elements, signal processing components, such as analog-to-digital converters (ADCs), amplifiers, buffers, drivers, regulators, or other suitable components. In some embodiments, the control circuitry 220 can also include one or more processors to process incoming data to generate outputs, such as the control signals 214. In some embodiments, the control circuit 220 can also include one or more components for communicating and sending and receiving data with other circuitries in the electric vehicle. For example, the various components and circuits within the system 100, including components in the control circuitry 220 can be in communication with one another using protocols or interfaces such as a CAN bus. And in some embodiments, the processing of incoming data can be at least in part performed by other components not in the control circuitry 220 within the electric vehicle as the control circuitry 220 communicates with other components.

Figure 3:
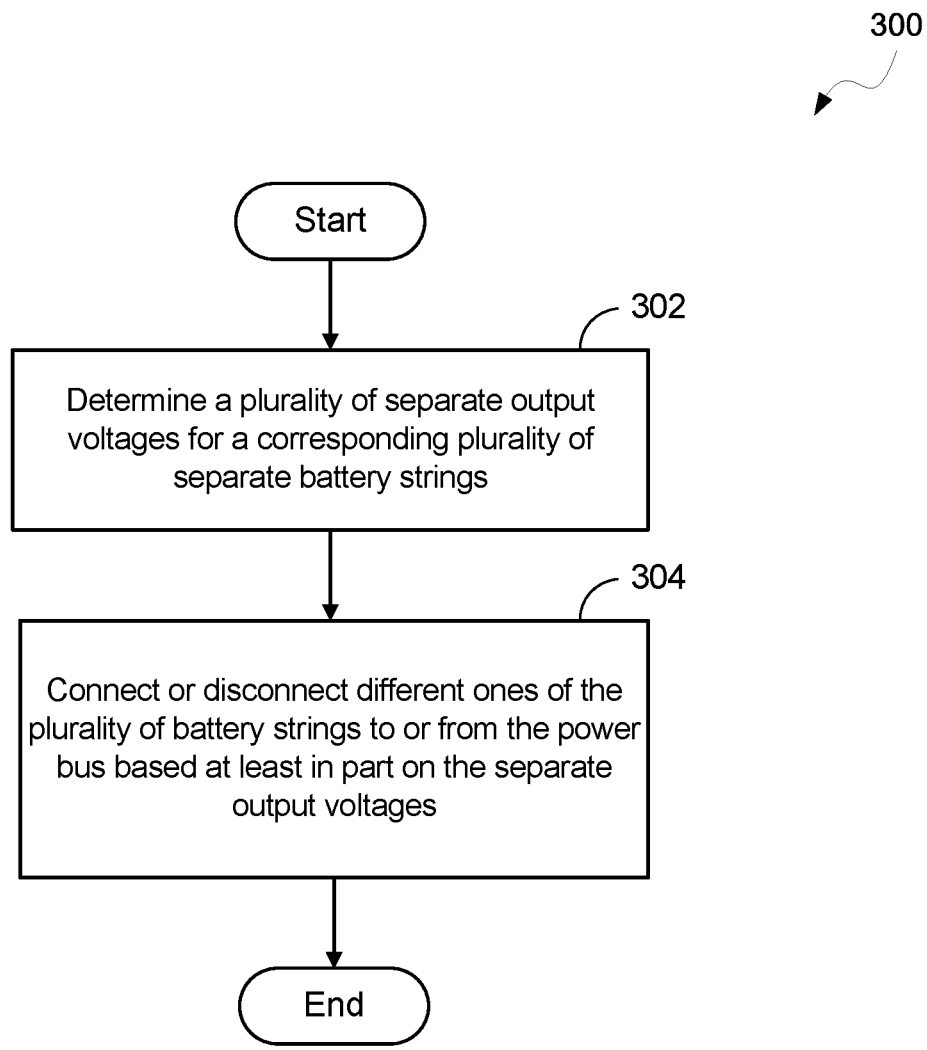
FIG. 3 is a flowchart of an example battery charge or discharge process according to one embodiment.

FIG. 3 is a flowchart of an example battery charge and/or discharge process according to one embodiment. The illustrated process 300 can be performed at least in part by and/or in conjunction with, for example, the control circuitry 220 (FIG. 2), the current sensors 208 (FIG. 2), voltage sensors, and other similar sensors. It is to be noted that all or parts of steps 302 and 304 may be concurrently, continuously, periodically, intermittently, repeatedly, or iteratively performed, and the illustrated process in FIG. 3 is only one example of the disclosed herein according to one embodiment.

In step 302, a plurality of separate output voltages, $V\_a$, $V\_b$, ..., $V\_n$, ..., from the separate battery strings 206a, 206b, ..., 206n, ... (FIG. 2) can be determined. As discussed above in connection with FIG. 2, the plurality of output voltages can be determined from the outputs of sensors coupled to the battery strings 206.

In step 304, different ones of the plurality of battery strings 206 can be connected to or disconnected from one or more of the power buses 202, 204 (FIG. 2). As further discussed in connection with FIG. 4 below, the control circuitry 220 (FIG. 2), for example, can determine which one or more of the battery strings 206 be connected to or disconnected from the power buses 202, 204 based at least in part on the output voltages, $V\_a$, $V\_b$, ..., $V\_n$. In some embodiments, the connecting or disconnecting of the battery strings 206 can also be based at least in part on the currents, $I\_a$, $I\_b$, ..., $I\_n$, from the battery strings 206. Further details of the connecting or disconnecting of the battery strings 206 are discussed further below.

Figure 4:
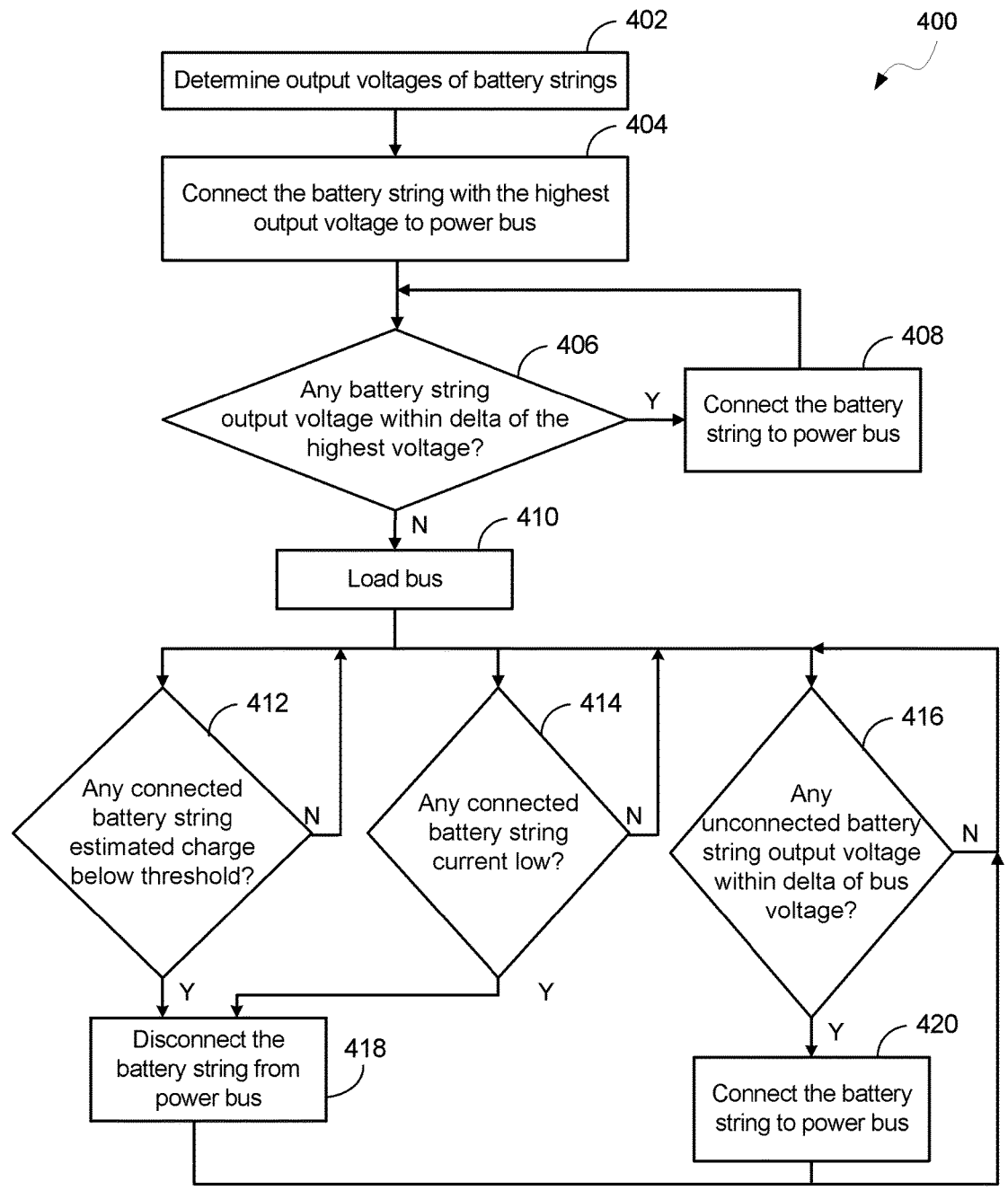
FIG. 4 is a flowchart of another example battery charge or discharge process according to one embodiment.

FIG. 4 is a flowchart of another example battery discharge process according to one embodiment. The illustrated process 400 can be performed at least in part by and/or in conjunction with, for example, the control circuitry 220 (FIG. 2), the current sensors 208 (FIG. 2), voltage sensors, and other similar sensors. It is to be noted that all or parts of steps 402, 404, 406, 408, 410, 412, 414, 416, 418, and 420 may be concurrently, continuously, periodically, intermittently, repeatedly, or iteratively performed, and the illustrated process in FIG. 4 is only one example of the disclosed herein according to one embodiment.

In step 402, the output voltages (e.g., $V\_a, V\_b, \ldots, V\_n$) of the battery strings 206 can be determined. Step 402 can be substantially similar and correspond to step 302 discussed above. In some embodiments, step 402 can be performed as a part of an initialization process or start-up process an electric vehicle drive system 100 (FIG. 1). For example, prior to step 402, the electric vehicle drive system 100 may have been parked, powered down, turned off, or otherwise idle not requiring the voltage source 110 to provide power such that all the battery strings 206 have been disconnected. As the electric vehicle drive system 100 is being powered up, for example, the process 400 can proceed to determine which of the battery strings 206 can be connected to the power buses 202, 204 (FIG. 2). In some embodiments, the measured or determined voltage outputs of the battery strings 206 can be stored in memory (not shown) within the system 100 for further processing or later use.

In step 404, the battery string 206 having the highest output voltage is connected to the power buses 202, 204 based on one or more of the control signals 214 from the control circuitry 220. In some embodiments, one or more processors in the control circuitry 220 can be used to receive, store, compare, and/or sort the voltage outputs from the individual battery strings 206. Also, in some embodiments, a predetermined order based on the assigned location of the battery strings 206, for example, can further be used in determining which battery string 206 to connect to the power buses 202, 204 first. For example, if the voltage output of the battery string 206a is equal to the voltage output of the battery string 206c, the processor may be configured to select the battery string 206a to connect to the power buses 202, 204 first based on the comparative locations of the battery strings 206a and 206c. When the control circuitry 220 determines which one of the battery strings 206 should be connected first (e.g., 206b), the corresponding control signal 214 (e.g., 214b) can be outputted to the corresponding switches 210 (e.g., 210b) and 212 (e.g., 212b) so that the selected battery string 206 (e.g., 206b) can be connected to the power buses 202, 204. Although the respective set of switches 210 and 212 of one battery string 206 as illustrated in FIG. 2 are controlled by the same corresponding signal 214, in other embodiments, the control circuitry 220 can output separate signals for controlling the switches 210 and 212 separately.

In step 406, the control circuitry 220 determines whether any other battery string output voltages are within a delta of the highest battery string output voltage determined in step 404. In some embodiments, the delta voltage can range from about ±2-10V. The delta voltage can also be further adjusted based on the system requirements and specifications. If it is determined that there is at least one another battery string outputting a level of voltage within a delta of the highest voltage, the process 400 proceeds to step 408. If it is determined that other battery strings are outputting voltages that are not within a delta of the highest voltage, the process 400 proceeds to step 410.

In step 408, one of the battery strings 206 identified as having an output voltage within a delta of the highest voltage can be connected to the power buses 202, 204 similar to how the battery string 206 having the highest output voltage is connected to the power buses 202, 204 as discussed above. When the one of the battery strings 206 identified to be within a delta of the highest voltage is connected to the power buses 202, 204, the process may loop back to step 406 to determine if there is another battery string 206 that is within a delta of the highest voltage. In some embodiments, the connection of the plurality of the battery string 206 through steps 406 and 408 can be done in the order of the output voltage levels determined and sorted in decreasing order by the processor in step 402. Also in some embodiments, the connecting of the plurality of battery strings 206 can be staggered or otherwise timed to ease sudden connections to the high power sources. When all the battery strings 206 with output voltages within a delta of the highest output voltage are connected to the power buses 202, 204 through steps 406 and 408, the process proceeds to step 410.

In step 410, as power is provided by one or more of the battery strings 206 to the positive and negative power buses 202 and 204, the power buses 202, 204 can be loaded with the load 105 as discussed above in connection with FIG. 1. The electric vehicle drive system 100 can thus be powered up, and the electric vehicle can be in operation (e.g., driven). As the electric vehicle is operated with power source from the battery strings 206 connected to the power buses 202, 204, the process 400 can proceed to steps 412, 414, and 416 to determine whether one or more of the connected or disconnected battery strings 206 should be disconnected or connected respectively. In some embodiments, steps 412, 414, and 416 can be performed continually with certain intervals throughout the operation of the electric vehicle. The embodiments disclosed herein allow modular connection or disconnection of the battery strings 206 not only for initializing the electric vehicle drive system 100 (FIG. 1) but also in response to the power usage and operations (faulty or not) of the electric vehicle as further discussed below. It is to be noted that the modular connection and disconnection of the battery strings 206 illustrated in process 400 are only example criteria based on example parameters, and other similar determinations can be made to connect or disconnect a battery string 206 from the power buses 202, 204 based on other variables or parameters. In some embodiments, the steps 412, 414, 416, 418, and 420 and the intermediate stages of the looped steps can be implemented as a state machine, with interrupt functions, with a timed function using counters, or using any other suitable mechanism or algorithm to implement monitoring of the voltages and currents of the connected or unconnected battery strings 206, determining whether to change the connected state of the battery strings 206, and generating sequentially and/or in parallel respective switch control signals 214.

In step 412, it is determined whether any already connected one of the battery strings 206 has a remaining charge below a charge threshold. As discussed above in connection with FIG. 2, the current sensors 208 can be used to determine the amount of current discharged from the respective battery strings 206. In some embodiments, state of charge of a connected battery string 206 can be estimated based on the current measured by the current sensors 208 and the voltages at the power buses 202, 204. It can be advantageous to monitor the state of the connected battery strings 206 to determine whether to disconnect the battery strings 206 as some battery strings 206 may discharge quicker than others, and in some instances, a quicker than usual discharge may indicate a fault or an error in the battery strings 206. As such monitoring the charge state of the connected battery strings 206 allows minimizing the risk of quick or faulty discharge that may, for example, damage the cells in the discharging battery strings 206. If it is determined that one of the connected battery strings 206 has an estimated charge below threshold, the process 400 can proceed to step 418.

In step 414, it is determined whether any of the connected battery strings 206 has a current below a floor current. As discussed above in connection with FIG. 2 the current sensors 208 can measure the current flowing from the battery strings 206. Similar to the advantages of step 412, determining whether a connected battery string 206 is below a floor current can allow an adaptive response to, for example, a faulty or significantly weakened battery string that may not be able to provide enough power to the load, if not costing power to the drive system 100. If it is determined that the current of a connected battery string 206 is below a floor current, the process 400 can proceed to step 418.

In step 416, it is determined whether the voltages of the unconnected battery strings 206 are within a delta of the derated bus bar voltage. The derated bus bar voltage can be an estimation of the string open circuit voltage that would result in the given bus bar voltage at a given load. If the output voltage of an unconnected battery string 206 is within a delta of the derated bus bar voltage, it may indicate that the voltage across the unconnected battery string 206 and the voltage at the bus bar that are connected to other battery strings 206 are close enough not to incur too much current or charge flow, which can affect the usage and wear and tear of the battery strings or incur undesirable current surge. As the vehicle is operated with only some of the battery strings 206 connected to the power buses, the voltages of the connected battery strings 206 can decline to the point that the voltages of the connected battery strings 206 get close to the voltages of the unconnected battery strings 206. As such, the unconnected battery string 206 can be within a delta of the derated bus bar voltage, allowing connection of the unconnected battery string 206 without a big change in current or voltage. It can be advantageous to allow adaptive connection of the battery strings 206 as disclosed herein since some operations of the electric vehicle may not require the full battery power of all the battery strings while the system 100 can stay adaptive to any change in necessary power as more battery strings 206 can be connected to the power buses. Therefore, the disclosed herein facilitates balancing the appropriate level of power, efficiency, and reliability in powering the system 100.

In step 418, the selected battery string 206 is disconnected from the power buses 202, 204 as the selected battery string 206 is determined to have an estimated state of change below a threshold and/or output a current below a floor current. In some embodiments, the control circuitry 220 can output a corresponding switch control signal 214 to disconnect the selected battery string 206. At least during the operation of the electric vehicle, the process 400 partially loops back after step 418 and continually monitors the current and voltage levels of the battery strings 206 to make connection or disconnection determinations.

In step 420, the selected battery string 206 is connected to the power buses 202, 204 as the selected battery string 206 is determined to be within a delta of the derated bus bar voltage. Similar to the delta voltage in step 206, the delta voltage can range from about ±2-10V. In some embodiments, the control circuitry 220 can output a corresponding switch control signal 214 to connect the selected battery string 206. Similar to step 418, at least during the operation of the electric vehicle, the process 400 partially loops back after step 420 and continually monitors the current voltage levels of the battery strings 206 to make connection or disconnection determinations. Although not illustrated in FIG. 4, it is to be noted that steps 418 and 420 of disconnecting a connected battery string 206 from or connecting a unconnected battery string 206 to the power buses 202, 204 can be timed, queued, or delayed, implemented, for example, with a certain waiting period after a change in connection status to minimize frequent connection and disconnection of the battery strings 206 in edge cases, in which the relevant voltage, current, or charge is just at the cusp of the delta voltage, floor current, or charge threshold that may otherwise trigger frequent opening and closing of the switches 210, 212.

As disclosed herein, it can be advantageous to connect or disconnect the battery strings to account for varying levels of operational voltages and maximize power output while minimize damage or wear and tear resulting from repeated usage of the battery as the adaptive connecting and disconnecting of the battery strings as disclosed herein can minimize intermediate current flowing in and out of the battery strings and charging and discharging of the battery strings amongst one another. Also, using multi-string batteries as disclosed herein can be advantageous to allow adaptive operation using less than full voltage source power, continuous operation of the electric vehicle despite local battery faults, and ease of maintenance as the battery strings can be separately replaceable. Furthermore, as the connecting and disconnecting of the battery strings can be digitally and intelligently controlled, optimal sequence of connections, various timing windows or waiting times, the threshold or delta voltages, or other similar variables can be adjusted according to system requirements and specification. The features disclosed herein can be implemented in compliance with government safety standards and regulations or industry standards such as automotive standards set by the Society of Automotive Engineers (SAE).

It is to be noted that the process 400 and the steps described in connection with the process 400 can be operated in reverse when the regenerative power internal to the electric vehicle drive system 100 is used to charge the battery strings 206 so that the battery strings 206 can be adaptively connected and/or disconnected as the battery 110 is charged with the operational, internal regenerative power (e.g., from breaking) without creating large change in voltage and current, which can be advantageous ad described above.

Figure 5:
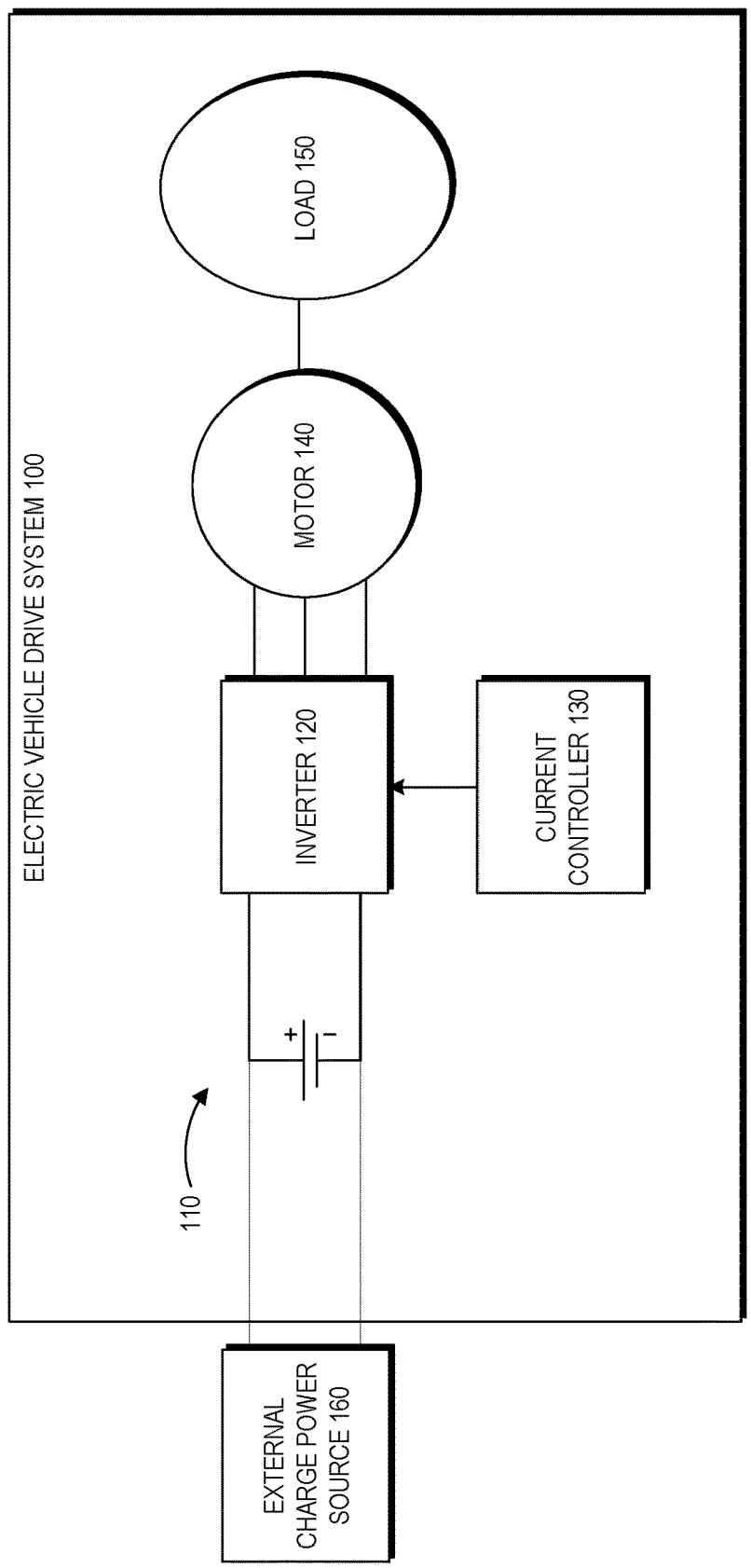
FIG. 5 is a block diagram of another example electric vehicle drive system according to one embodiment.

FIG. 5 depicts a block diagram of an example electric vehicle drive system 100 including a battery or voltage source 110 as described herein. The electric vehicle drive system 100 includes the battery 110, an inverter 120 coupled to the battery 110, a current controller 130, a motor 140, and load 150. Same or similar numerals or designations illustrated in FIGS. 1 and 5 indicate same or corresponding features. FIG. 5 further includes an external charge power source 160 that is external to and does not travel with the electric vehicle.

The multi-string battery 110 can be charged with regenerative power generated during the electric vehicle is in operation (e.g., breaking). The external charge power source 160 can be a power source for charging the battery 110 that is external to the electric vehicle, such as the power source for stationary charging stations or residences, whose charging power can delivered to the electric vehicle through a plug, inductive pad, etc. As regenerative charging mechanism and the external charge power source 160 can provide charging power to the battery 110 of the electric vehicle, the multi-string battery 110 can adaptively get connected and charged and/or disconnected.

Figure 6:
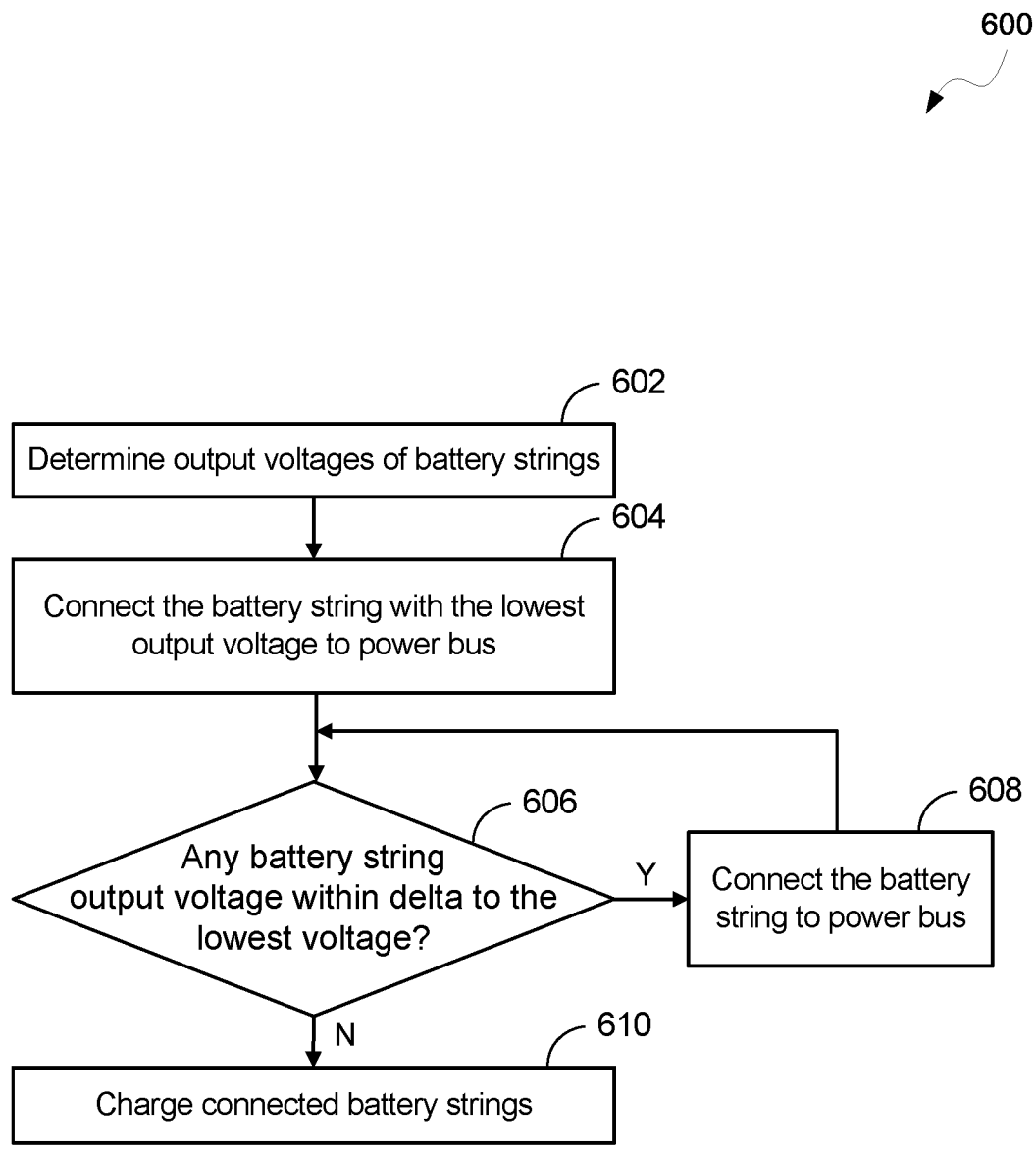
FIG. 6 is a flowchart of another example battery charge process according to one embodiment.

FIG. 6 is a flowchart of another example battery charge process according to one embodiment. The illustrated process 600 can be performed at least in part by and/or in conjunction with, for example, the control circuitry 220 (FIG. 2), the current sensors 208 (FIG. 2), voltage sensors, and other similar sensors. It is to be noted that all or parts of steps 602, 604, 606, 608, and 610 may be concurrently, continuously, periodically, intermittently, repeatedly, or iteratively performed, and the illustrated process in FIG. 6 is only one example of the disclosed herein according to one embodiment.

In step 602, the output voltages (e.g., $V\_a, V\_b, \ldots, V\_n$) of the battery strings 206 can be determined. Step 602 can be substantially similar and correspond to step 302 discussed above. In some embodiments, step 602 can be performed as a part of an power-down or stationary charging process an electric vehicle drive system 100 (FIG. 1). For example, prior to step 402, the electric vehicle drive system 100 may have been driven or otherwise in operation requiring the voltage source 110 to provide power such that at least one of the battery strings 206 have been connected. As the electric vehicle drive system 100 is being charged with an external power source 160, for example, the process 600 can proceed to determine which of the battery strings 206 can be disconnected from and connected to the power buses 202, 204 (FIG. 2). In some embodiments, the measured or determined voltage outputs of the battery strings 206 can be stored in memory (not shown) within the system 100 for further processing or later use.

In step 604, the battery string 206 having the lowest output voltage is connected to the power buses 202, 204 as the battery strings 206 having the lowest output voltage may be in need of more charging. In some embodiments, prior to step 604, all or substantially all of the battery strings with higher output voltages can be sequentially disconnected from the power buses 202, 204 so that the connecting of the battery string 206 with the lowest output voltage would not create a big voltage differential. In some embodiments, one or more processors in the control circuitry 220 can be used to receive, store, compare, and/or sort the voltage outputs from the individual battery strings 206. Also, in some embodiments, a predetermined order based on the assigned location of the battery strings 206, for example, can further be used in determining which battery string 206 to connect to the power buses 202, 204 first. For example, if the voltage output of the battery string 206a is equal to the voltage output of the battery string 206c, the processor may be configured to select the battery string 206a to connect to the power buses 202, 204 first based on the comparative locations of the battery strings 206a and 206c. When the control circuitry 220 determines which one of the battery strings 206 should be connected first (e.g., 206b), the corresponding control signal 214 (e.g., 214b) can be outputted to the corresponding switches 210 (e.g., 210b) and 212 (e.g., 212b) so that the selected battery string 206 (e.g., 206b) can be connected to the power buses 202, 204. Although the respective set of switches 210 and 212 of one battery string 206 as illustrated in FIG. 2 are controlled by the same corresponding signal 214, in other embodiments, the control circuitry 220 can output separate signals for controlling the switches 210 and 212 separately.

In step 606, the control circuitry 220 determines whether any other battery string output voltages are within a delta of the lowest battery string output voltage determined in step 604. In some embodiments, the delta voltage can range about ±2-10V. The delta voltage can also be further adjusted based on the system requirements and specifications. If it is determined that there is at least one another battery string outputting a level of voltage within a delta of the lowest voltage, the process 600 proceeds to step 608. If it is determined that other battery strings are outputting voltages that are not within a delta of the lowest voltage, the process 600 proceeds to step 610.

In step 608, one of the battery strings 206 identified as having an output voltage within a delta of the lowest voltage can be connected to the power buses 202, 204 similar to how the battery string 206 having the lowest output voltage is connected to the power buses 202, 204 as discussed above. When the one of the battery strings 206 identified to be within a delta of the lowest voltage is connected to the power buses 202, 204, the process may loop back to step 606 to determine if there is another battery string 206 that is within a delta of the lowest voltage. In some embodiments, the connection of the plurality of the battery strings 206 through steps 606 and 608 can be done in the order of the output voltage levels determined and sorted in decreasing order by the processor in step 602. Also in some embodiments, the connecting of the plurality of battery strings 206 can be staggered or otherwise timed to ease sudden connections to the power buses 202, 204. When all the battery strings 206 with output voltages within a delta of the lowest output voltage are connected to the power buses 202, 204 through steps 606 and 608, the process proceeds to step 610.

In step 610, as power is provided by one or more of the battery strings 206 to the positive and negative power buses 202 and 204, charging of the connected battery strings 206 can be performed through the power buses 202, 204 as discussed above in connection with FIG. 5. Similar to the process 400 discussed above, the embodiments disclosed herein allow modular connection or disconnection of the battery strings 206 not only for charging of the electric vehicle drive system 100 (FIG. 1) at a stationary station but also in response to the power regeneration, usage and operations (faulty or not) of the electric vehicle. Furthermore, the process 600 can include further repeated or looped steps for more determinations regarding the output voltages of the unconnected battery strings 206 can be made similar to step 416 above so that the unconnected battery string 206 can be connected to the power buses 202, 204 as appropriate.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

APPLICATIONS

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:
1. An electric vehicle comprising:
   a motor coupled to one or more wheels of the electric vehicle;
   an inverter coupled to the motor;
   at least a first power bus coupled to the inverter; and
   a plurality of battery strings including a first battery string having an output that is coupled to the first power bus through a first switch, a second battery string different from the first battery string having an output that is coupled to the first power bus through a second switch different from the first switch, and a third battery string different from the first and second battery strings hav- ing an output that is coupled to the first power bus through a third switch different from the first and second switches;

control circuitry coupled to at least the first switch, the second switch, and the third switch, the control circuitry configured to selectively and independently control the open or closed state of the first, second, and third switches, thereby selectively and independently connecting the output of the first, second, and third battery strings, including:

opening the first switch and, with the first switch open, measuring a first voltage across the first battery string, opening the second switch and, with the second switch open, measuring a second voltage different from the first voltage across the second battery string, opening the third switch and, with the third switch open, measuring a third voltage different from the first and second voltage across the third battery string, closing the first switch, thereby connecting the first battery string to the first power bus, based at least in part on a determination that the first voltage is higher than both the second and third voltage, closing the second switch, thereby connecting the second battery string to the first power bus, based on a determination that the second voltage is within a first threshold voltage difference below the first voltage, not closing the third switch, and thereby not connecting the third battery string to the first power bus, based on a determination that the third output voltage is not within the first threshold voltage difference below the first voltage, upon determining that power is being delivered to the electric motor from at least the first and second battery strings and with the first and second switches closed, measuring a power bus voltage on the first power bus, determining a derated power bus voltage based on the power bus voltage on the first power bus;

with power being delivered to the electric motor and with at least the first and second switches closed, closing the third switch, thereby connecting the third battery string to the first power bus, based on a determination that the third output voltage is within a second threshold voltage difference below the determined derated power bus voltage.

2. The electric vehicle of claim 1, comprising a first current sensor in series with the first switch, and a second current sensor in series with the second switch.

3. The electric vehicle of claim 1, wherein the first battery string and the second battery string have outputs coupled to a second power bus through respective fourth and fifth switches.

4. The electric vehicle of claim 3, wherein the control circuitry is configured to control the open or closed state of the fourth and fifth switches.

5. The electric vehicle of claim 1, wherein the first battery string, the second battery string, and the third battery string each comprise a plurality of modules of cells connected in parallel and wherein each of the plurality of modules of cells comprise a plurality of cells connected in series.

6. The electric vehicle of claim 1, wherein the control circuitry is configured to measure a first output current of the first battery string when the first switch is closed and an output current of the second battery string when the second switch is closed.

7. A method of powering an electric vehicle, the electric vehicle comprising an electric motor driven with a power bus, the method comprising:

determining a plurality of separate output voltages for a corresponding plurality of separate battery strings of the electric vehicle including a first battery string having a first output voltage, a second battery string having a second output voltage, and a third battery string having a third output voltage wherein the first, second, and third output voltages are different from one another;

connecting the first battery string to the power bus based on a determination that the first output voltage is the highest of the plurality of separate output voltages;

connecting the second battery string to the power bus based on a determination that the second output voltage is within a first threshold voltage difference below the first output voltage;

not connecting a third battery string to the power bus based on a determination that the third output voltage is not within the first threshold voltage difference below the first output voltage;

delivering power to the electric motor from at least the first and second battery string;

while delivering power to the electric motor from the first and second battery string, determining a power bus voltage of the power bus;

also while delivering power to the electric motor from the first and second battery string, connecting the third battery string to the power bus based on a determination that the third output voltage is within a second threshold voltage difference below the determined power bus voltage; and disconnecting different ones of the plurality of battery strings to the power bus based at least in part on the determined plurality of separate output voltages.

8. The method of claim 7, comprising, prior to delivering power to the electric motor from the first and second battery string, determining that a first set of the plurality of battery strings have output voltages that are within the first threshold voltage difference below the first output voltage, with the remaining plurality of battery strings making up a second set of the plurality of battery strings, and connecting all of the first subset of battery strings to the power bus based on that determination.

9. The method of claim 8, comprising, prior to delivering power to the electric motor from the first and second battery string, not connecting any of the second set of battery strings.

10. A method of powering an electric vehicle comprising:

initially connecting some but not all of a plurality of battery strings of the electric vehicle to a power bus;

loading the power bus with an electric motor of the electric vehicle;

while the power bus is loaded with the electric motor, measuring the voltage of the power bus;

measuring a voltage of an unconnected one of the plurality of battery strings; and while still loading the power bus with the electric motor, connecting the unconnected one of the plurality of battery strings to the power bus if based on a determination that the voltage of the unconnected one of the plurality of battery strings is within a threshold voltage below the measured voltage of the power bus.

11. The method of claim 10, further comprising measuring at least one discharge current for at least one connected one of the plurality of battery strings.

12. The method of claim 11, further comprising: disconnecting a connected one of the plurality of battery strings if the discharge current of the connected one of the plurality of battery strings is below a threshold.

13. The method of claim 11, further comprising:
storing a measured initial voltage of at least one of the plurality of battery strings; estimating a state of charge of at least one of the plurality of battery strings based in at least part on the stored initial voltage and the measured discharge current of the at least one of the plurality of battery strings;
and disconnecting the at least one of the plurality of battery strings if the estimated state of charge of the at least one of the plurality of battery strings is below a threshold.

* * * * *